US006406088B1

(12) United States Patent
Tate (10) Patent No.: US 6,406,088 B1
(45) Date of Patent: Jun. 18, 2002

(54) CRASH RAIL FOR A VEHICLE

(75) Inventor: Michael Tate, Bolton (GB)

(73) Assignee: Lotus Cars Limited, Norfolk (GB)

( * ) Notice: Subject to any disclaimer, the term of this patent is extended or adjusted under 35 U.S.C. 154(b) by 0 days.

(21) Appl. No.: 09/856,825

(22) PCT Filed: Nov. 26, 1999

(86) PCT No.: PCT/GB99/03975

§ 371 (c)(1),
(2), (4) Date: May 24, 2001

(87) PCT Pub. No.: WO00/30916

PCT Pub. Date: Jun. 2, 2000

(30) Foreign Application Priority Data

Nov. 26, 1998 (GB) ............................................. 9825970
Apr. 1, 1999 (GB) ............................................. 9907710

(51) Int. Cl.⁷ ................................................. B60J 7/00
(52) U.S. Cl. ................. 296/189; 296/188; 296/203.02; 296/205; 188/377; 188/371
(58) Field of Search ............................... 296/189, 188, 296/203.02, 201; 188/377, 371

(56) References Cited

U.S. PATENT DOCUMENTS 3,831,997 A * 8/1974 Myers ......................... 296/189
3,848,886 A * 11/1974 Feustel et al. ............... 296/189

(List continued on next page.)

FOREIGN PATENT DOCUMENTS

FR 2 761 434 10/1998

OTHER PUBLICATIONS

Copy of the International Search Report, Together with a Copy of the US Equivalent (US Pat.# 5,868,457) to the German Language Document Cited Therein (DE195 26 398A).
Copy of First Written Opinion (Again Citing the Above German Language Document).
Preliminary Examination Report citing French Pat. 2 761434 and US Pat. 5419416.

Primary Examiner—Ken Patel
(74) Attorney, Agent, or Firm—Fulwider Patton Lee & Utecht, LLP (57) ABSTRACT

The present invention provides a crash rail for a vehicle. The crash rail has a root portion which can be anchored to a part of the vehicle, a tip portion which is spaced apart from the root portion and which is located nearer a potential impact point of the vehicle when the root portion is anchored to the said part of the vehicle and a middle portion which extends from the root portion to the tip portion. The crash rail comprises a wall which defines a groove or a cavity in the crash rail. The groove or the cavity in the crash rail has a cross-sectional area which increases gradually from the tip portion to the root portion. The wall has a thickness which increases gradually from the tip portion to the root portion. The wall is composed of a composite material having fibers set in a resin material. The crash rail can be crushed when the vehicle impacts with another object to thereby absorb energy of the impact. During the impact the crash rail disintegrates with the resin separating from the fibers set therein. During the impact the crash rail disintegrates progressively with the tip portion disintegrating first and then the middle portion and lastly the root portion.

43 Claims, 9 Drawing Sheets

U.S. PATENT DOCUMENTS

| | | | | |
|---|---|---|---|---|
| 3,983,962 A | * | 10/1976 | Torke | 188/377 |
| 4,194,763 A | * | 3/1980 | Reidelbach et al. | 296/189 |
| 4,702,515 A | * | 10/1987 | Kato et al. | 296/189 |
| 5,033,593 A | * | 7/1991 | Kazuhito | 296/189 |
| 5,346,276 A | * | 9/1994 | Enning et al. | 296/189 |
| 5,419,416 A | * | 5/1995 | Miyashita et al. | 188/377 |
| 5,429,388 A | * | 7/1995 | Wheatley et al. | 296/189 |
| 5,542,365 A | * | 8/1996 | Jurisich et al. | 188/377 |
| 5,732,801 A | * | 3/1998 | Gertz | 188/377 |
| 5,853,195 A | * | 12/1998 | Le et al. | 296/189 |
| 5,868,457 A | | 2/1999 | Kitagawa | |
| 5,876,078 A | * | 3/1999 | Miskech et al. | 296/189 |
| 5,913,565 A | * | 6/1999 | Watanabe | 296/189 |
| 6,003,934 A | * | 12/1999 | Usui | 296/189 |
| 6,099,071 A | * | 8/2000 | Kasuga et al. | 296/189 |
| 6,174,009 B1 | * | 1/2001 | McKeon | 188/377 |
| 6,250,711 B1 | * | 6/2001 | Takahara | 296/189 |
| 6,293,587 B1 | * | 9/2001 | Lapic et al. | 188/377 |
| 6,296,301 B1 | * | 10/2001 | Schroeder et al. | 296/188 |
| 6,312,028 B1 | * | 11/2001 | Wilkosz | 296/189 |
| 6,312,038 B1 | * | 11/2001 | Kawamura et al. | 296/189 |
| 2001/0024052 A1 | * | 9/2001 | Takahara | 296/188 |
| 2001/0024053 A1 | * | 9/2001 | Takase et al. | 296/189 |
| 2001/0033094 A1 | * | 10/2001 | Sano et al. | 296/189 |
| 2002/0000738 A1 | * | 1/2002 | Larsson et al. | 296/188 |

* cited by examiner

CRASH RAIL FOR A VEHICLE

The present invention relates to a crash rail suitable for use in a vehicle.

It is an acknowledged requirement that motor vehicles should have a rigid passenger cell resistant to deformation and, at least in front and behind the passenger cell, crash structures which on impact of the vehicle with another object deform in a controlled manner to absorb the energy of the impact and to protect passengers located in the passenger cell. These crash structures can comprise crash rails.

The present invention provides a crash rail for a vehicle comprising:

- a root portion which can be anchored to a part of the vehicle;
- a tip portion which is spaced apart from the root portion and which is located nearer a potential impact point of the vehicle when the root portion is anchored to the said part of the vehicle; and
- a middle portion which extends from the root portion to the tip portion; wherein:
- the crash rail comprises a wall which defines a groove or a cavity in the crash rail;
- the groove or the cavity in the crash rail has a cross-sectional area which increases gradually from the tip portion to the root portion;
- the wall has a thickness which increases gradually from the tip portion to the root portion;
- the wall is composed of a composite material having fibres set in a resin material;
- the crash rail can be crushed when the vehicle impacts with another object to thereby absorb energy of the impact;
- during the impact the crash rail disintegrates with the resin separating from the fibres set therein; and
- during the impact the crash rail disintegrates progressively with the tip portion disintegrating first and then the middle portion and lastly the root portion.

The present invention also provides a wheeled motor vehicle comprising the crash rail described above.

Preferred embodiments of the present invention will now be described by way of example only with reference to the accompanying drawings in which.

Figure 1:
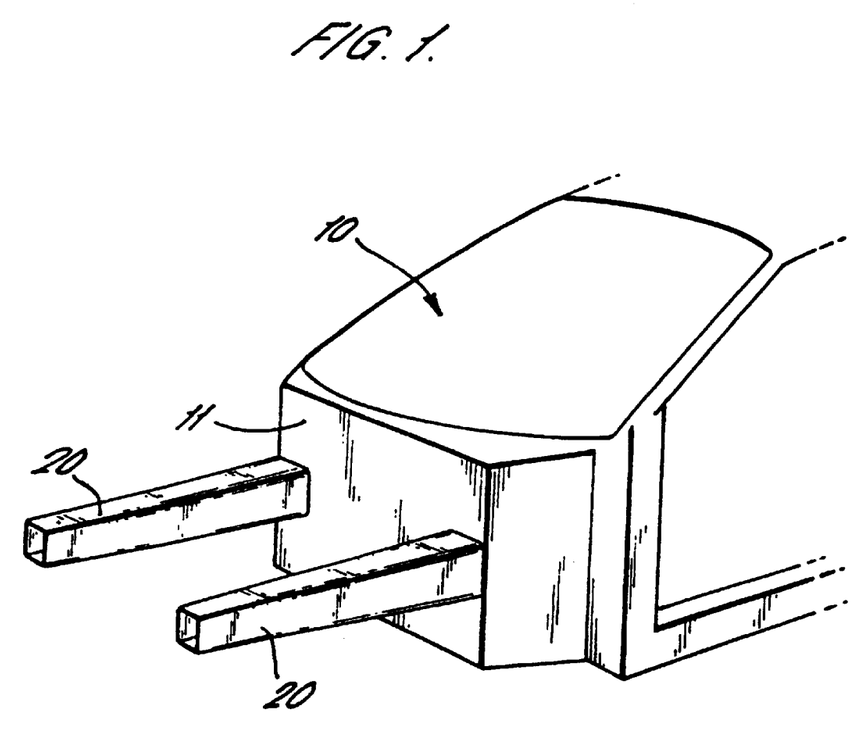
FIG. 1 is a schematic view of a front of a vehicle stripped away to reveal two crash rails according to a first embodiment of the present invention.

Referring first to FIG. 1, there can be s seen a passenger cell 10 of a motor vehicle having a front bulkhead 11. Attached to the bulkhead 11 and extending forward of the bulkhead 11 are two crash rails 20. These crash rails 20 extend one either side of an engine (not shown) of the motor vehicle, through the vehicle front wings (not shown). The forwardmost ends of the crash rails 20 are connected together by a bumper (not shown) of the vehicle, to which they are both attached.

Figure 2:
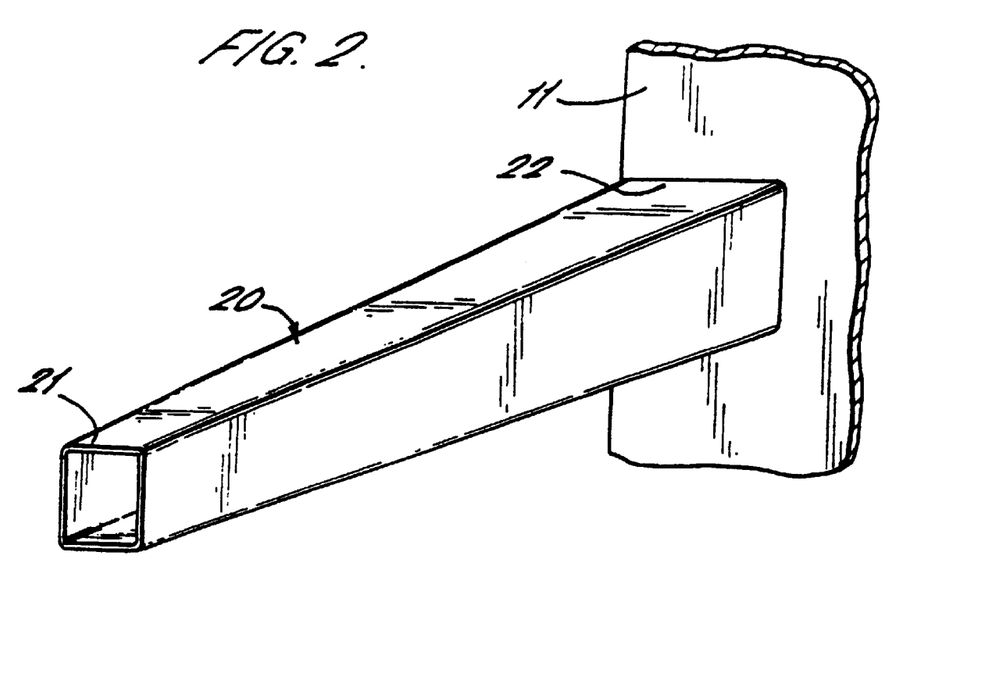
FIG. 2 is a perspective view of one of the crash rails shown in FIG. 1.
Figure 3:
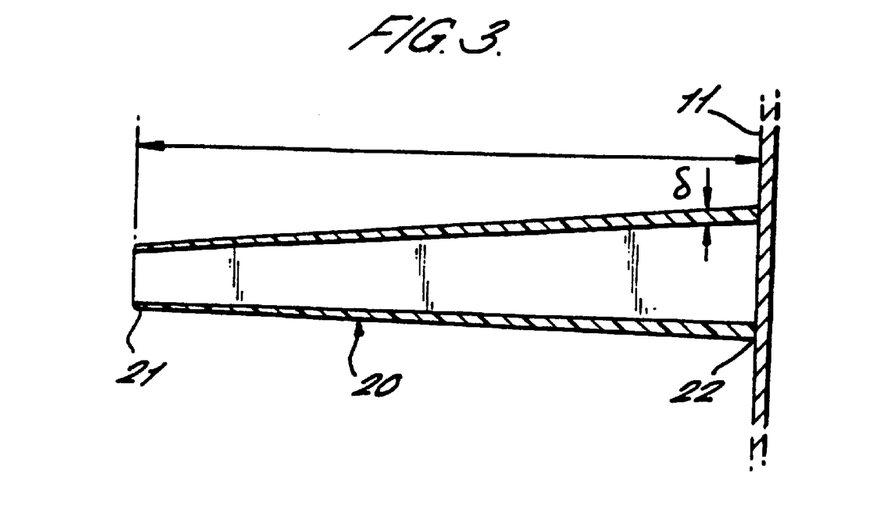
FIG. 3 is a cross-section through the crash rail of FIG. 2.

Each crash rail 20 is composed of a composite material comprising fibres arranged in a resin matrix. The composite material is described in detail below. As can be seen at 21 in FIG. 2, each crash rail 20 has a hollow square or rectangular transverse cross-section. The cross-sectional area of each crash rail 20 tapers linearly from a largest cross-section at a root portion 22 of the crash rail 20 adjacent the bulkhead 11 to a smallest cross-section at the forwardmost tip portion 21 of the crash rail 20. Furthermore, as is illustrated in FIG. 3, the wall thickness $\delta$ of a crash rail 20 tapers linearly from a largest wall thickness $\delta$ at the root portion 22 to a smallest wall thickness $\delta$ at the tip portion 21.

Typically in a passenger motor vehicle each of the crash rails 20 will be 600 to 700 mm long and the wall thickness $\delta$ will decrease from a maximum of 6 mm in the root portion 22 to a minimum of 2.5 mm in the tip portion 21.

Figure 4:
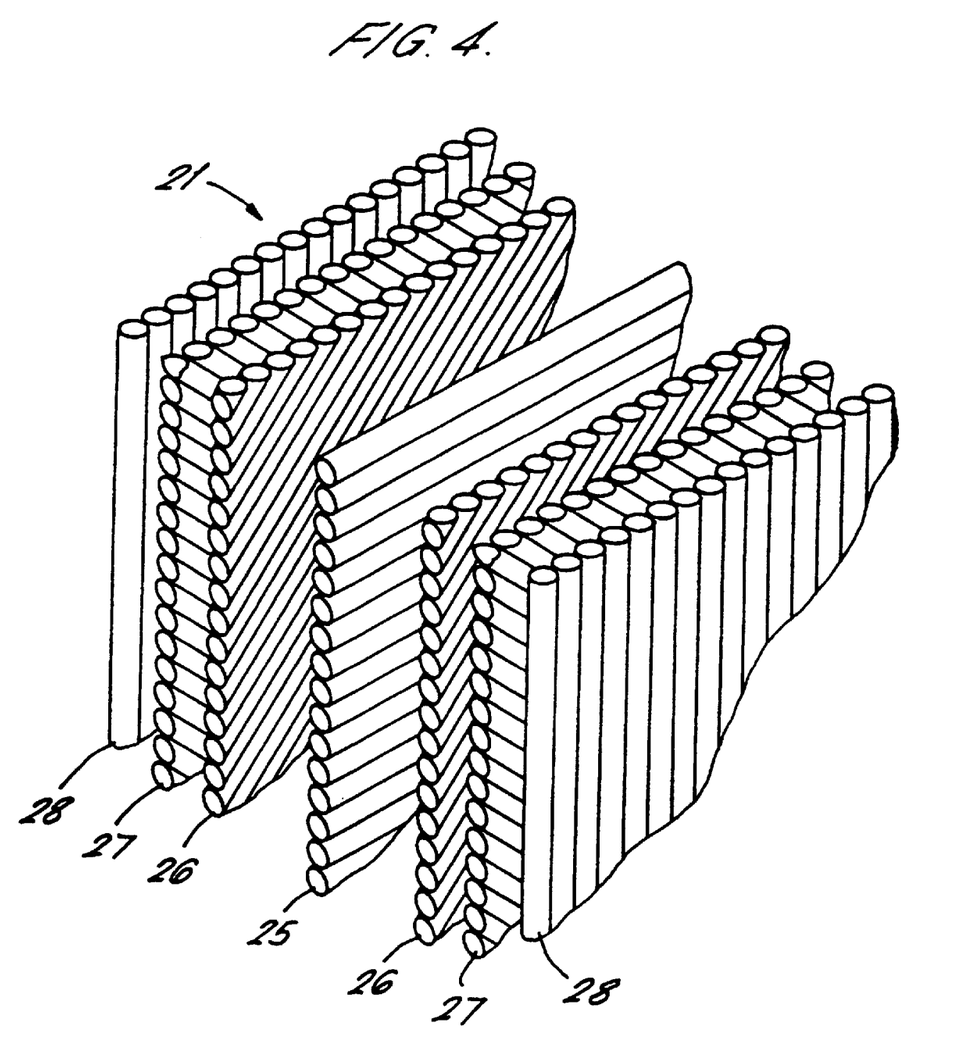
FIG. 4 is an exploded perspective view showing the arrangement of fibres in a tip portion of a wall of the crash rail of FIGS. 2 and 3.
Figure 5:
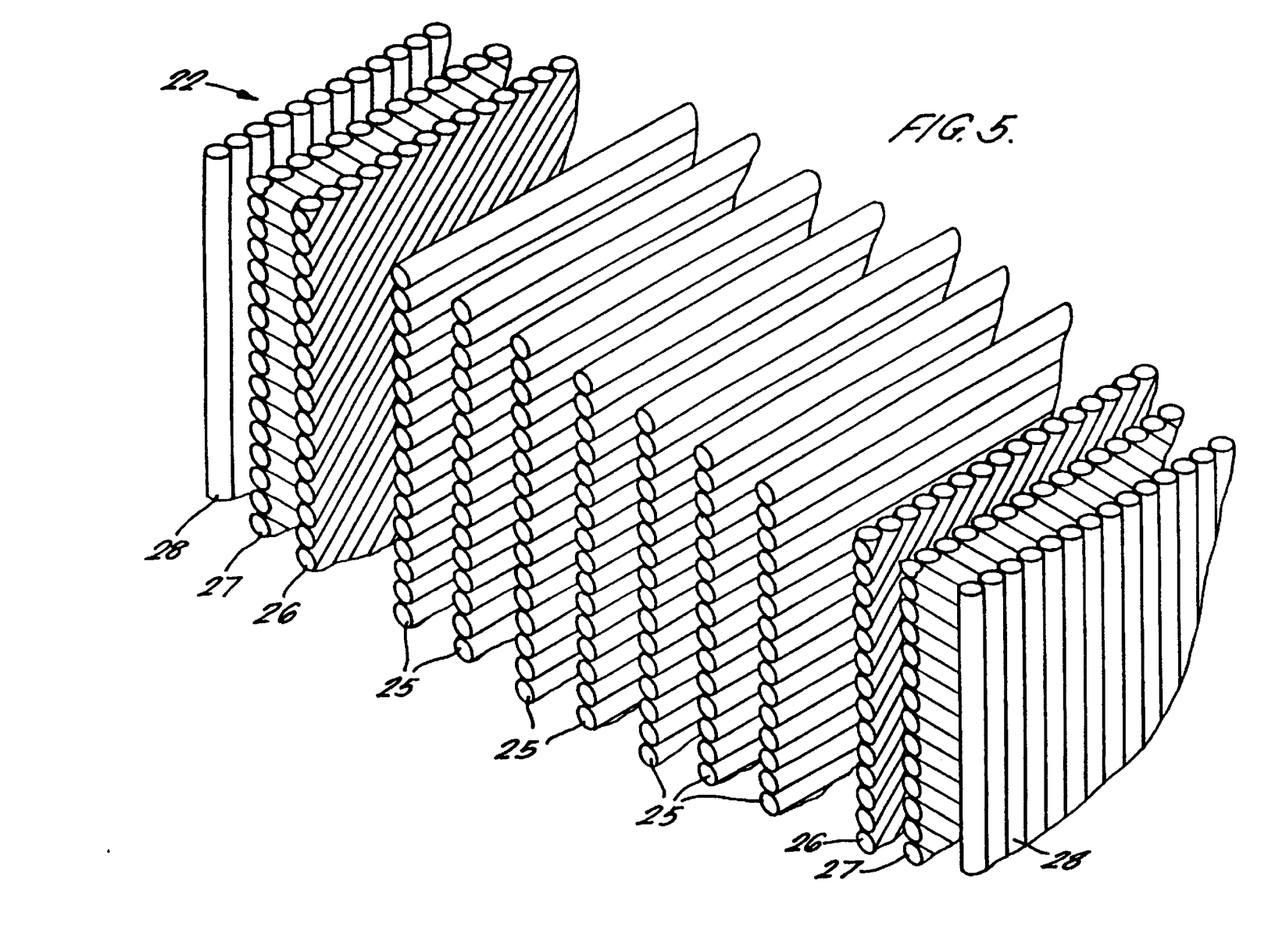
FIG. 5 is an exploded perspective view showing the arrangement of fibres in a root portion of a wall of the crash rail of FIGS. 2 and 3.
Figure 6:
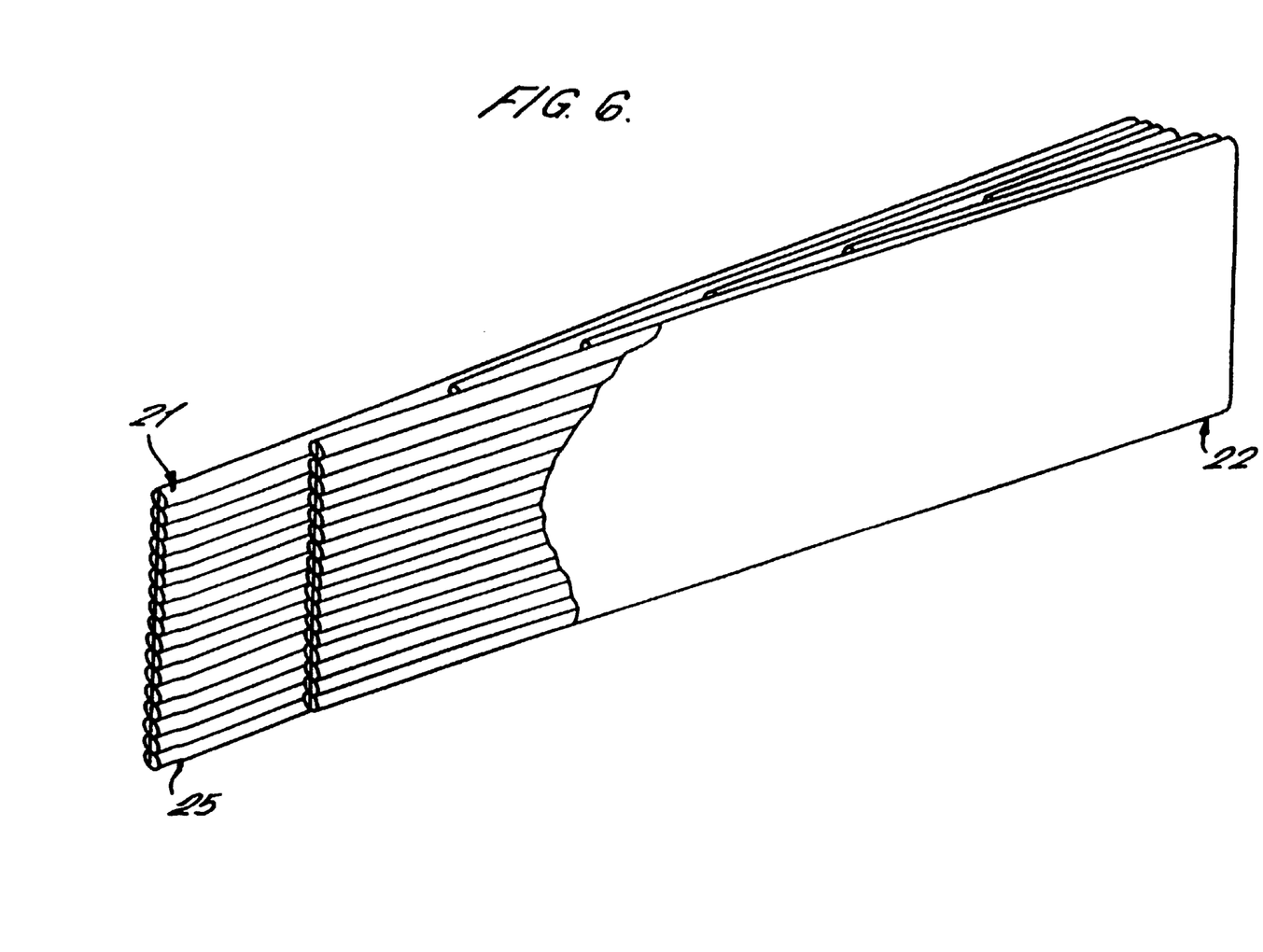
FIG. 6 is a schematic view illustrating the arrangement of longitudinal fibres in the core of a wall of the crash rail according to the present invention.

Referring now to FIGS. 4 and 5, there can be seen respectively tip and root portions of a wall of a crash rail 20. The wall is composed of a composite material comprising a plurality of layers 25, 26, 27, 28 of fibres arranged in a resin matrix. Layers 26, 27, 28 of fibrous matting are provided near the exterior surfaces of the crash rail 20 and layers 25 of glass fibres in the centre. The longitudinal fibres in layers 25 are all orientated to run lengthwise along the tapering walls of the crash rail 20, each extending from the root portion 22 towards the tip portion 21. The longitudinal fibres in layers 25 in the core are of different lengths and are arranged in bundles (tows) so as to form laminae of different lengths. All of the longitudinal fibres 25 run forwardly from the root portion 22 of the crash rail 20, but only the longest run all the way to the tip portion 21. The remainder of the longitudinal fibres 25 stop short at defined intervals so as to form a graduated arrangement of laminae which provides the requisite taper in the crash rail 20. This arrangement is best illustrated in FIG. 6.

The fibrous matting comprises fibres 26, 27, 28 which are omnidirectional in nature and which extend along the entire length of the crash rail 20.

In the preferred embodiment, the fibrous matting layers 26, 27, 28 comprises carbon fibres and the layers 25 in the core comprises glass fibres. The crash rail 20 can be formed by hand laying the fibrous matting and the longitudinally extending fibres 25 in a mould tool and then injecting a polyester resin (e.g. with vacuum assistance) into the mould tool when closed. Epoxy or polyvinyl resins can be used.

The configuration of the fibres in the crash rail 20 gives the crash rail 20 material properties which vary along its length. At the tip portion 21 of the crash rail 20, the presence of the omnidirectional fibre matting dominates the material characteristics as can best be seen in FIG. 4. Conversely, the omnidirectional fibrous matting has a lesser influence on the characteristics of the material in the root portion 22 of the crash rail 20 as can best be seen in FIG. 5. This distribution of fibres is significant in terms of the way in which the crash rail 20 performs.

The crash rails 20 are designed to crush in a controlled manner in a crash. Metal crash rails known in the art have a high tendency to buckle on impact, but the crash rails 20 of the present invention are designed not to buckle. Instead, during an impact the crash rails 20 gradually disintegrate from their tip portions 21 progressing towards the root portions 22 as the resin matrix of each rail 20 detaches from the fibres 25, 26, 27, 28 it encases. The crash rails 20 are designed such that the material of each rail 20 starts to disintegrate well before the crash rails 20 buckle under the applied d forces, even when the applied forces do not act longitudinally along the crash rails 20 but apply bending moments to them. The tapering cross-sectional area of the crash rails 20 and the tapering wall thickness δ help the crash rails 20 to resist bending.

The crash rails 20 are designed so that the static strength of the rails increases towards the root 22, typically from 200 MPa near the tip 21 of the crash rail 20 to 270 MPa near the root 22 (due to the varying material properties along the crash rail 20 due to the fibre reinforcement configuration). When the rails 20 are being crushed in an impact the dynamic strength of the material (i.e. the strength of that part of the material being crushed/disintegrating) is considerably less than the static strength. The dynamic strength also varies along the crash rail, typically from 80 MPa at the tip 21 to 40 MPa at the root 22, due to the varying material characteristics along the crash rail 20 occasioned by the distribution of fibres 25, 26, 27, 28. It is important to have decreasing material crush strength towards the root 22 in order to achieve a fairly constant crush force along the length of the crash rail 20. The crush force is the product of the crush resistance and the cross-sectional area of material. Since the cross-sectional area of material to be crushed increase towards the root 22, the crush resistance must be decreased in order to ensure a reasonably consistent crush force.

The energy dissipation of the composite material during crushing compares favourably with steel. Steel has a typical value of 5 J/g (energy dissipated per unit mass), whilst the composite material has a typical value of 35 J/g. The invention permits the use of 6 Kg of composite material in place of 35 Kg of steel.

The crash rails 20 illustrated in FIG. 1 are flared outwardly slightly (i.e. the centres of the root portion 22 of the crash rails 20 are closer to one another than the centres of the tip portions 21). This helps the crash rails 20 deal with offset impacts.

Figure 7:
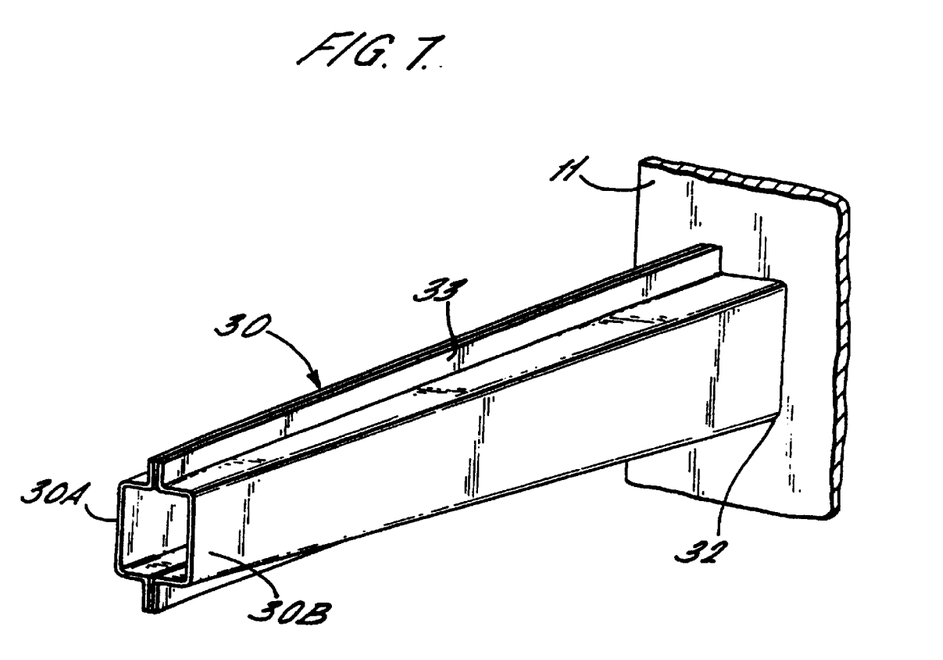
FIG. 7 is a perspective view of a second embodiment of crash rail according to the present invention.

A second embodiment of crash rail 30 according to the present invention is shown in FIG. 7. The crash rail 30 tapers in the same way as the crash rail 20 and has a wall thickness which increases towards the root portion 32 which is attached to the bulkhead 11. However, whilst the crash rail 20 is formed as a single integer the crash rail 30 is formed from two component parts 30A and 30B which have flanges (e.g. 33) and which are joined together by adhesive along the flanges. The fibres in the crash rail 30 are laid out in the same fashion as those described with crash rail 20. The crash rail 30 functions in the same way as the crash rail 20, but crash rail 30 is easier to manufacture.

Figure 8:
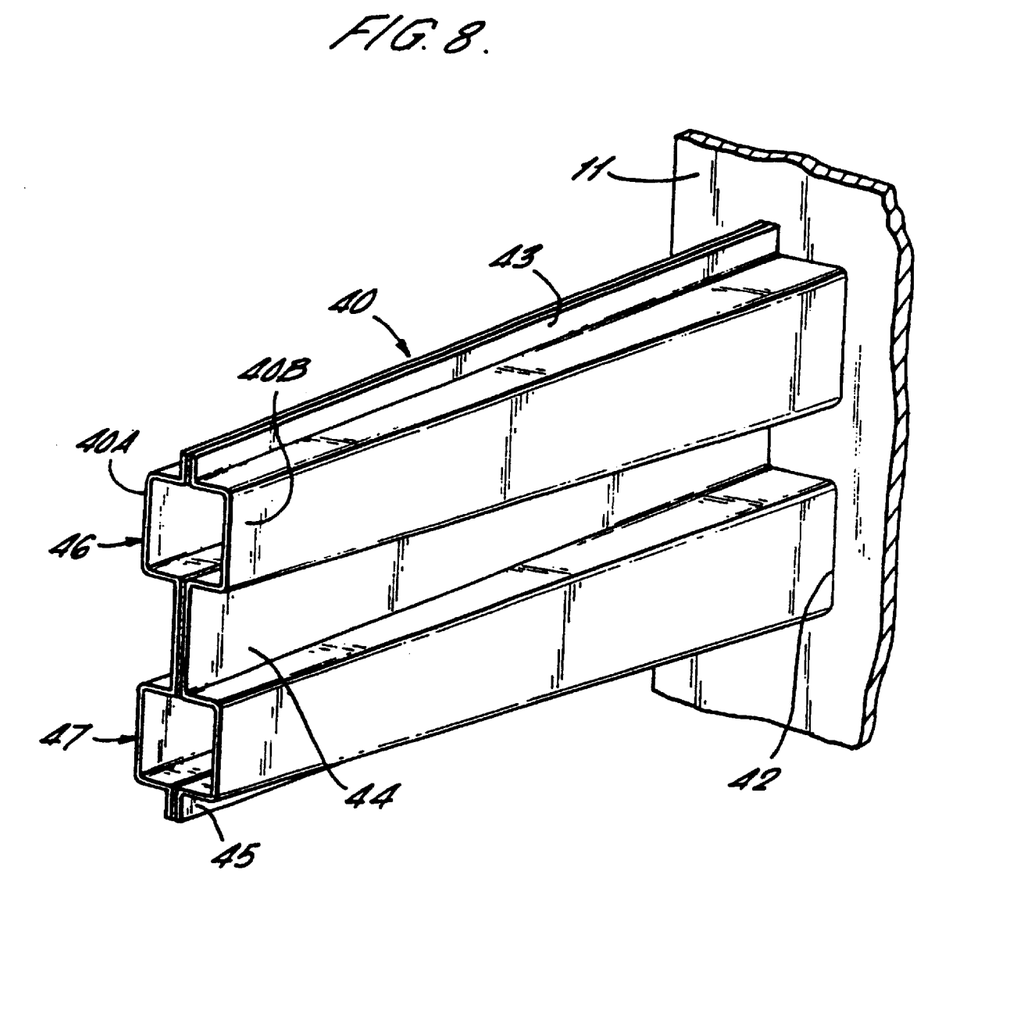
FIG. 8 is a perspective view of a third embodiment of crash rail according to the present invention.

A third embodiment of crash rail 40 according to the present invention is shown in FIG. 8. In this embodiment the crash rail 40 comprises effectively two crash rails 30 joined together. The crash rail 40 is formed of two matching parts 40A and 40B. The parts 40A and 40B have flanges (e.g. 43, 44, 45) which can abut each other and which are joined together by an adhesive. When the two parts 40A and 40B are adhered together they define two parallel identical hollow cross-sectional tapering rail portions 46, 47. Each rail portion 46, 47 has a cross-section and a wall thickness which increases towards the root portion 42 thereof, in the same manner as the crash rails 20 and 30. The fibres in each rail portion 46, 47 are laid out in the same fashion as those described in the crash rails 20 and 30. The crash rail 40 will operate during an impact in the same way as crash rails 20 and 30, and will operate as a pair of parallel spaced apart crash rails 30.

Figure 9:
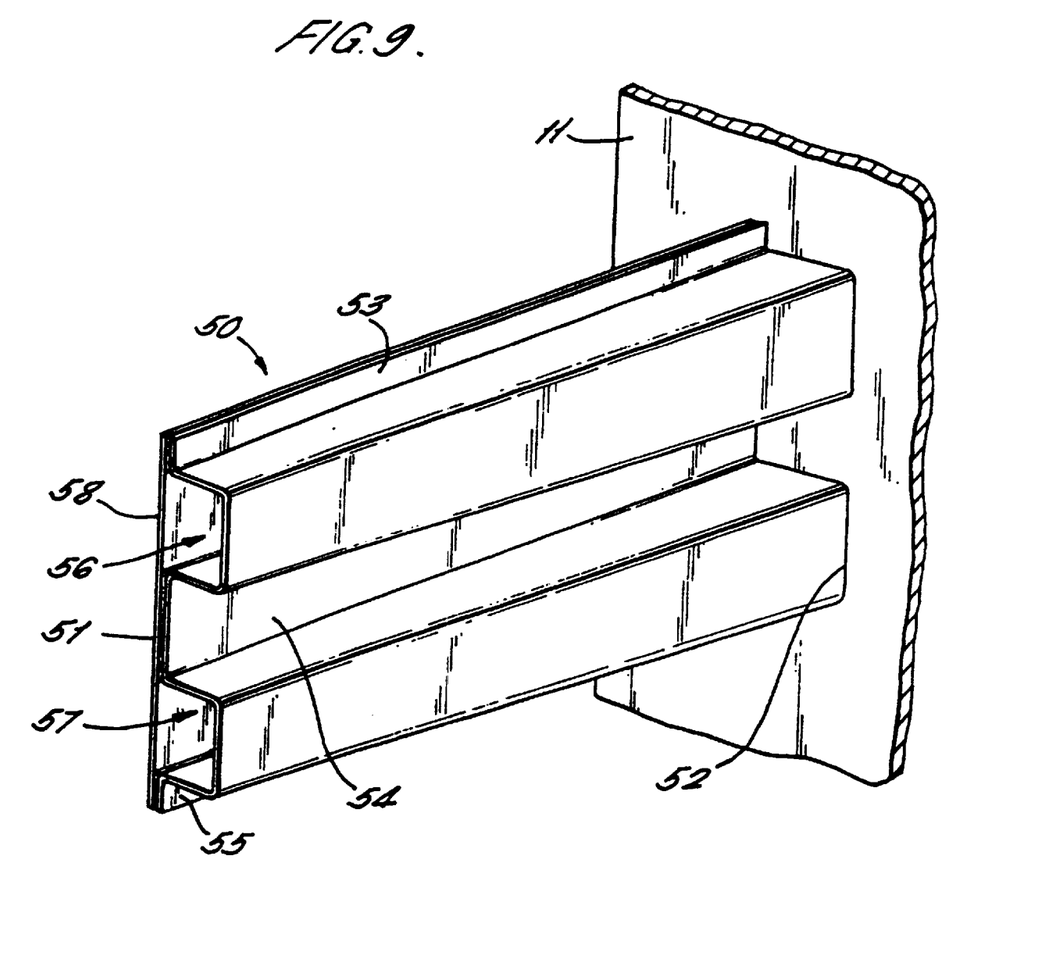
FIG. 9 is a perspective view of a fourth embodiment of crash rail according to the present invention.

A further embodiment of crash rail 50 according to the present invention is shown in FIG. 9. The crash rail 50 comprises a corrugated sheet equivalent to one half (e.g. 40B) of the crash rail 40. Attached to flanges 53, 54, 55 of the crash rail 50 is a flat sheet 58. The sheet 58 is attached by an adhesive. The flat sheet 58 and the corrugated sheet define two hollow tapering cavity sections 56, 57. The cross-sectional areas of these sections 56, 57 taper linearly along the length of the crash rail 50 from areas of greatest cross-section at the root portions 52 to areas of smallest cross-section at the tip portions 51. The wall thickness of the corrugated sheet will increase linearly towards the root portion 52 of the rail 50.

During a crash the material of the corrugated sheet will disintegrate as with the crash rails 20, 30 and 40. However, the flat sheet 58 will not disintegrate, but will peel away from the corrugated sheet. The peeling will be facilitated by a suitable choice of adhesive bonding between the flat sheet 58 and the corrugated sheet.

Whilst above the cross-sections of the cavities in the crash rails 20, 30, 40, 50 are either square or rectangular, the cross-sections could be of any convenient polygonal shape and could be curved in nature. For example, the crash rails 20, 30, 40 could be of circular sections and crash rail 50 of semi-circular section.

The flat sheet 58 of crash rail 50, up until peeling away, acts as a stabilising panel and helps the corrugated sheet resist torsional loads. The flat sheet 58 could form a panel of an engine bay of a vehicle. The flat sheet 58 will typically be a glass fibre panel. The flat sheet 58 could itself be corrugated, with corrugations smaller than those of the corrugated panel. The corrugations of the flat sheet 58 would prevent cracks propagating throughout the adhesive layer between the sheet 58 and the corrugated sheet on impact.

Figure 10:
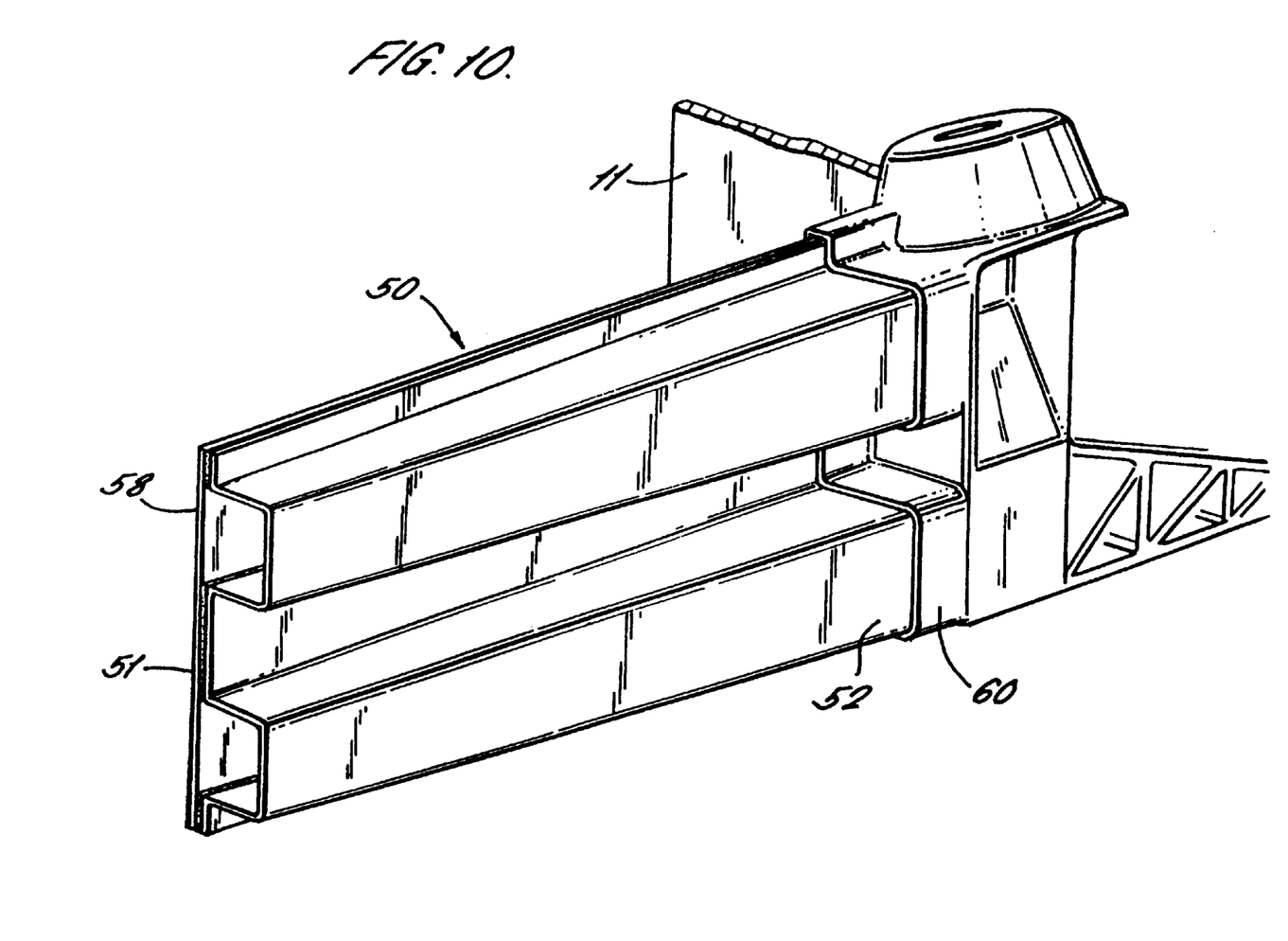
FIG. 10 is a perspective view of the crash rail of FIG. 9 in an alternative configuration.

The crash rails 20, 30, 40, 50 could be mounted to the bulkhead 11 by slotting the root ends 22, 32, 42, 52 into matching slots in cast uprights attached to or integral with the bulkhead 11. A suitable arrangement for crash rail 50 is illustrated in FIG. 10. A cast upright 60 is formed integrally with bulkhead 11 and receives the root portion 52. With such an arrangement, the crash rails 20, 30, 40, 50 could be used to provide the main support for the whole front end of a motor vehicle, i.e. forming the main connection between the front end (front wings, bonnet, front suspension, front subframe, engine) and the remainder of the vehicle.

The front tips 21, 31, 41, 51 of the crash rails 20, 30, 40, 50 could be flanged to assist the attachment of the front tips 21, 31, 41, 51 to a bumper.

Whilst above the crash rails 20, 30, 40, 50 have been described as having cavities of closed cross-section, and this is advantageous for torsional rigidity, a crash rail could be formed from a corrugated sheet with a groove or grooves open to one side, provided that the cross-sectional area(s) of the groove(s) taper(s) in accordance with the present invention and the wall thickness(es) of the corrugated sheet also taper(s).

It will be appreciated that whilst the crash rail according to the present invention has been described for use as a crash structure in front of a passenger cell of a vehicle, the crash rails 20, 30, 40, 50 described above are equally suitable for use in providing a crash structure at the rear of a passenger cell.

What is claimed is:

1. A crash rail for a vehicle comprising:
   a root portion which can be anchored to a part of the vehicle;
   a tip portion which is spaced apart from the root portion and which is located nearer a potential impact point of the vehicle when the root portion is anchored to the said part of the vehicle; and
   a middle portion which extends from the root portion to the tip portion; wherein:
   the crash rail comprises a wall which defines a groove or a cavity in the crash rail;
   the groove or the cavity in the crash rail has a cross-sectional area which increases gradually from the tip portion to the root portion;
   the wall has a thickness which increases gradually from the tip portion to the root portion;
   the wall is composed of a composite material having fibres set in a resin material;
   the crash rail can be crushed when the vehicle impacts with another object to thereby absorb energy of the impact;
   during the impact the crash rail disintegrates with the resin separating from the fibres set therein; and
   during the impact the crash rail disintegrates progressively with the tip portion disintegrating first and then the middle portion and lastly the root portion.

2. A crash rail as claimed in claim 1 wherein the wall comprises longitudinal fibres which extend along the wall from the root portion towards the tip portion.

3. A crash rail as claimed in claim 2 wherein all of the longitudinal fibres extend from the root portion, the longitudinal fibres being arranged in bundles of different lengths, some of the fibres extending to the tip portion and the rest being of graduated length so as to stop short of the tip portion.

4. A crash rail as claimed in claim 3 wherein each bundle of longitudinal fibres is arranged so that each fibre lies side by side to form a lamina of defined length and each bundle forms a separate lamina of different length.

5. A crash rail as claimed in claim 2 wherein the wall comprises additionally multidirectional fibres distributed along the length of the crash rail.

6. A crash rail as claimed in claim 5 wherein the multidirectional fibres are present in a mat set in the resin material.

7. A crash rail as claimed in claim 5 wherein the multidirectional fibres are provided near the surface of the wall of the crash rail.

8. A crash rail as claimed in claim 5 wherein at the tip portion of the crash rail the percentage of the wall which comprises the multidirectional fibres is greater than the percentage of the wall comprising the multidirectional fibres at the root portion.

9. A crash rail as claimed in claim 5 wherein at the root portion of the crash rail the percentage of the wall which comprises longitudinal fibres is greater than the percentage of the wall comprising the longitudinal fibres at the tip portion.

10. A crash rail as claimed in claim 1 which is formed as a single piece hollow moulding with a cavity extending therethrough.

11. A crash rail as claimed in claim 10 wherein the cavity is of generally square cross-section.

12. A crash rail as claimed in claim 10 wherein the cavity is of generally rectangular cross-section.

13. A crash rail as claimed in claim 10 wherein the cavity is of generally circular cross-section.

14. A crash rail as claimed in claim 1 comprising two moulded portions each having a groove, whereby when the moulded portions are joined together the grooves in the moulded portions co-operate together to define a cavity extending along the crash rail.

15. A crash rail as claimed in claim 14 wherein the grooves are each U-shaped and together define a square cross-section cavity.

16. A crash rail as claimed in claim 14 wherein the grooves are each U-shaped and together define a rectangular cross-section cavity.

17. A crash rail as claimed in claim 14 wherein the grooves are each of semi-circular section and together define a circular cross-section cavity.

18. A crash rail as claimed in claim 14 wherein each moulded portion has two flanges adjacent the groove therein and the flanges of the moulded portions are adhered together to join the moulded portions.

19. A crash rail as claimed in claim 1 comprising two corrugated moulded portions each having a pair of parallel spaced apart grooves which when the moulded portions are joined together form a pair of parallel extending cavities.

20. A crash rail as claimed in claim 19 wherein the pair of grooves are both U-shaped and together define square cross-section cavities.

21. A crash rail as claimed in claim 19 wherein the pair of grooves are both U-shaped and together define rectangular cross-section cavities.

22. A crash rail as claimed in claim 19 wherein the pair of grooves are both of semi-circular section and together define circular section cavities.

23. A crash rail as claimed in claim 19 wherein the moulded portions each have flanges moulded adjacent the grooves therein and each flange of one moulded portion is adhered to a facing flange of the other moulded portion to join the moulded portions.

24. A crash rail as claimed in claim 1 comprising a corrugated moulded portion having a groove and a panel joined to the moulded portion, the panel having a generally flat surface which defines with the groove a cavity extending along the crash rail.

25. A crash rail as claimed in claim 24 wherein the groove is U-shaped and defines with the generally flat surface a square cross-section cavity.

26. A crash rail as claimed in claim 24 wherein the groove is U-shaped and defines with the generally flat surface a rectangular cross-section cavity.

27. A crash rail as claimed in claim 24 wherein the groove is semi-circular and defines with the generally flat surface a semi-circular cross-section cavity.

28. A crash rail as claimed in claim 1 comprising a moulded portion having a pair of parallel extending grooves and a panel joined to the moulded portion, wherein the panel has a generally flat surface which defines with the grooves a pair of spaced apart cavities extending along the crash rail.

29. A crash rail as claimed in claim 28 wherein the grooves are U-shaped and define with the generally flat surface square cross-section cavities.

30. A crash rail as claimed in claim 28 wherein the grooves are U-shaped and define with the generally flat surface rectangular cross-section cavities.

31. A crash rail as claimed in claim 28 wherein the grooves are semi-circular and define with the generally flat surface semi-circular cross-section cavities.

32. A crash rail as claimed in claim 24 wherein the panel is adhered to the moulded portion by an adhesive which permits the panel to peel away from the moulded portion as the moulded portion disintegrates during impact.

33. A crash rail as claimed in claim 32 wherein the moulded portion has flanges to which the generally flat surface of the panel is adhered to join the moulded portion to the panel.

34. A crash rail as claimed in claim 33 wherein the generally flat surface-is slightly corrugated at least in those regions of the panel which are adhered to the flanges, the corrugations in the generally flat surfaces leaving areas where the adhesive does not interconnect the flanges and such areas acting to impede the spread of cracks through the adhesive.

35. A wheeled motor vehicle having a passenger cabin and a bumper located forward of the passenger cabin and a crash rail as claimed in claim 1 interconnecting the passenger cabin and the bumper.

36. A wheeled motor vehicle having a passenger cabin and a bumper located forward of the passenger cabins and a plurality crash rails each as claimed in claim 1, each crash rail being spaced apart from the other crash rails and each crash rail interconnecting the passenger cabin and the bumper.

37. A wheeled motor vehicle having a passenger cabin, an engine in an engine bay located forward of the passenger cabin, a bumper located forward of the engine bay and a pair of crash rails each as claimed in claim 1 interconnecting the passenger cabin and the bumper in spaced part configuration with one on either side of the engine bay.

38. A wheeled motor vehicle having a passenger cabin, an engine in an engine bay located forward of the passenger cabin, a bumper located forward of the engine bay and a pair of crash rails each as claimed in claim 24 wherein the panel of each crash rail has a surface which provides a liner surface for the engine bay.

39. A wheeled motor vehicle having a passenger cabin and a bumper located to the rear of the passenger cabin and a crash rail as claimed in claim 1 interconnecting the passenger cabin (10) and the bumper.

40. A wheeled motor vehicle having a passenger cabin and a bumper located to the rear of the passenger cabin (10) and a plurality crash rails each as claimed in claim 1, each rail being spaced apart and interconnecting the passenger cabin and the bumper.

41. A wheeled motor vehicle having a passenger cabin, an engine in an engine bay located to the rear of the passenger cabin, a bumper located to the rear of the engine bay and a pair of crash rails each as claimed in claim 1 interconnecting the passenger cabin and the bumper in spaced apart configuration with one on either side of the engine.

42. A wheeled motor vehicle having a passenger cabin, an engine in an engine bay located to the rear of the passenger cabin, a bumper located to the rear of the engine bay and a pair of crash rails each as claimed in claim 24 wherein the panel of each crash rail has a surface which provides a liner surface for the engine bay.

43. A wheeled motor vehicle as claimed in claim 35 wherein the crash rail or rails are connected to the passenger cabin by slotting the end or ends of the rail or rails into matching slots in uprights attached to the passenger cabin.

* * * * *